（12） United States Patent
Plocher et al.

(10) Patent No.: US 6,216,930 B1
(45) Date of Patent: Apr. 17, 2001

(54) SPECTACLE CASE BUILT INTO A VEHICLE

(75) Inventors: Bernd Plocher, Rottenburg-Seebronn; Friedrich Karrer, Pfalzgrafenweiler; Walter Funk, Simmersfeld; Michael Schmidt, Nufringen, all of (DE)

(73) Assignee: Fischerwerke Arthur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/423,562

(22) PCT Filed: May 5, 1998

(86) PCT No.: PCT/EP98/02641

§ 371 Date: Jan. 14, 2000

§ 102(e) Date: Jan. 14, 2000

(87) PCT Pub. No.: WO98/51537

PCT Pub. Date: Nov. 19, 1998

(30) Foreign Application Priority Data

May 15, 1997 (DE) .............................................. 197 20 364

(51) Int. Cl.[7] ...................................................... B60R 7/00
(52) U.S. Cl. .............................. 224/539; 224/483; 206/5; 296/37.7
(58) Field of Search .................................... 224/539, 483; 206/5, 6; 296/37.7

(56) References Cited

U.S. PATENT DOCUMENTS

| 2,927,685 | * | 3/1960 | Abbott | 206/6 |
| 3,381,806 | * | 5/1968 | McDonagh | 206/5 |
| 3,845,799 | * | 11/1974 | Mittell | 206/5 X |
| 4,469,365 | * | 9/1984 | Marcus et al. | 296/37.7 |
| 4,576,320 | * | 3/1986 | Mead | 224/311 |
| 5,261,582 | * | 11/1993 | Mathews et al. | 224/240 |
| 5,312,029 | * | 5/1994 | Tuber | 224/679 |
| 5,403,058 | * | 4/1995 | Fischer | 296/37.7 |
| 5,775,761 | * | 7/1998 | Asami et al. | 296/37.7 |

FOREIGN PATENT DOCUMENTS

0153502 * 12/1984 (EP) .
0 602 342 A1 6/1994 (EP) .
94/18032 * 8/1994 (WO) .

* cited by examiner

*Primary Examiner*—Stephen K. Cronin
(74) *Attorney, Agent, or Firm*—Michael J. Striker

(57) ABSTRACT

The invention relates to a container (10) for storing a pair of spectacles (54) which can be inserted into the space between a spectacle holder (56) and a pivotable housing lid (20). When the housing lid (20) is closed, two rubber bands (28), which are held under tension in a housing (12) of the container (10) beneath the housing lid (20), press the spectacles (54) against an inner side of the housing lid (20) so that the spectacles (54) are held securely in the housing lid (20) so as not to rattle.

8 Claims, 4 Drawing Sheets

SPECTACLE CASE BUILT INTO A VEHICLE

The invention relates to a container for storing spectacles and for building into a vehicle, having the features of the preamble of claim 1.

Such a container is known from EP 0 602 342 B1. The known container is used to store spectacles in a motor vehicle so that they can be picked up easily by the driver. Storage is dust-free. For aesthetic reasons, the spectacles should be concealed from view during storage.

The known container has a housing that is open at one side, which can be mounted in a motor vehicle, for example on or in a recess in the dashboard. The known container has a housing lid that is attached pivotably to the housing and which is connected via a coupling member to a carriage that is guided displaceably in the housing and moves the carriage to the open side of the housing when the housing lid is opened. Attached pivotably to the carriage is a receiving compartment for insertion of a pair of spectacles, which receiving compartment is pivoted, by way of a cranked lever of the coupling member, out of a position parallel with the carriage to a position inclined relative to the carriage after the carriage has been displaced. A pair of spectacles can be inserted or removed when the receiving compartment is in that inclined position.

The known container has the disadvantage that it is made up in a complicated manner of a large number of individual parts. A further disadvantage is that the spectacles lie loosely in the container, resulting in rattling noises while driving. In addition, as a result of continuous vehicle vibrations, the spectacles lying loosely in the container rub continuously against the receiving compartment, resulting in abrasion marks on the spectacles and on their lenses.

The problem underlying the invention is accordingly so to construct a container of the type mentioned at the beginning that a pair of spectacles is stored therein without rattling.

The problem is solved according to the invention by the features of claim 1. The container according to the invention has a box-like housing that is preferably open at one of its two large sides, which housing is closable by a pivotably attached housing lid. The housing lid is at the same time in the form of a receiving compartment for a pair of spectacles that can be placed therein. An elastic band mounted in the housing presses a pair of spectacles inserted into the housing lid against the inside of the housing lid when it is closed, so that the spectacles are held securely. This prevents the spectacles from moving in the closed container and causing rattling noises. Since the holding action prevents relative movement between the spectacles and the container, abrasion marks on the spectacles are avoided. A further advantage is that the container consists essentially of only three parts, namely the housing, the housing lid and the elastic band.

In a preferred embodiment of the invention, the elastic band is in the form of a rubber band which, when the housing lid is closed, extends in the housing approximately parallel with the housing lid and either spaced therefrom or not. As it is closed, the housing lid draws closer to the elastic band by such a distance that a space between the housing lid and the elastic band becomes narrower than the thickness of the spectacles. A pair of spectacles inserted into the housing lid is thereby pressed against the inside of the housing lid by the elastic band when the housing lid is closed and is thus held securely between the housing lid and the elastic band. As it opens, the housing lid moves away from the band so that the holding action is released and the spectacles can be removed from the housing lid that forms a receiving compartment for the spectacles. The elastic band is not in the way during removal or insertion of the spectacles. That embodiment of the invention provides holding of the spectacles in simple manner. The elastic band is moreover "spectacle-friendly".

In a further development of the invention, one end of the band is attached to the housing and another end of the band is attached to the housing lid so that the band acts as a tension spring element that pivots the housing lid. The band can be attached in such a manner that it draws the housing lid to its open position or to its closed position. It is also possible for the elastic band to be so attached to the housing and to the housing lid that, as it pivots the housing lid out of the closed position to the open position and vice versa, the elastic band crosses a pivotal axis of the housing lid. In that manner it is possible, as is known per se, for example, from the folding stand of a two-wheel vehicle, for the elastic band to draw the housing lid into the open position after it has crossed the pivotal axis of the housing lid in the opening direction and to draw the housing lid into the closed position after it has crossed the pivotal axis in the closing direction and thereby to hold the housing lid in both the open position and the closed position. The use of the elastic band as a tension spring element obviates the need for an additional drive element to pivot the housing lid.

An embodiment of the invention comprises a spectacle holder which is mounted on the inside of the housing lid and is spaced therefrom so that the spectacles can be inserted into the space between the spectacle holder and the housing lid. In a further development of that embodiment of the invention, the spectacle holder has free spaces in the region of spectacle hinges of a pair of spectacles inserted in the housing lid. As a result, it is possible to insert the spectacles into the housing lid with the spectacle arms still open and only thereafter to close them, that is to say lay them against the spectacle frame. The closed spectacle arms lie on an outer side of the spectacle holder remote from the housing lid. The elastic band or the spring element engages the closed spectacle arms after the container has been closed and presses them against the spectacle frame so that the spectacles together with their spectacle arms are held securely between the elastic band and the housing lid. That embodiment of the invention has the advantage that a pair of spectacles can be taken off and inserted into the housing lid with the spectacle arms still open, that is to say projecting from the spectacle frame. The spectacles no longer need to be held in one hand in order to close the spectacle arms since the spectacles are fixed in the housing lid. This applies correspondingly to removal of the spectacles from the container and putting them on.

In an embodiment of the invention, the housing lid has a rest for the nose bridge of the spectacles to be inserted therein. Moreover, a support is provided on which a lower rim of the spectacle frame of an inserted pair of spectacles, that is to say a point of the circumference of the spectacle lenses, comes to rest. The distance between the rest for the nose bridge and the support for the spectacle frame is adjustable in order to be able to adapt the container according to the invention to different pairs of spectacles.

In an embodiment of the invention there is provided a catch device that can be unlocked, which locks the housing lid in its closed position. By activation of the catch device, the housing lid can be opened or is pivoted open by the elastic band. The pivoting movement is preferably damped by means of a damping element.

The invention is explained hereinafter in greater detail with reference to an embodiment shown in the drawings, in which.

Figure 1:
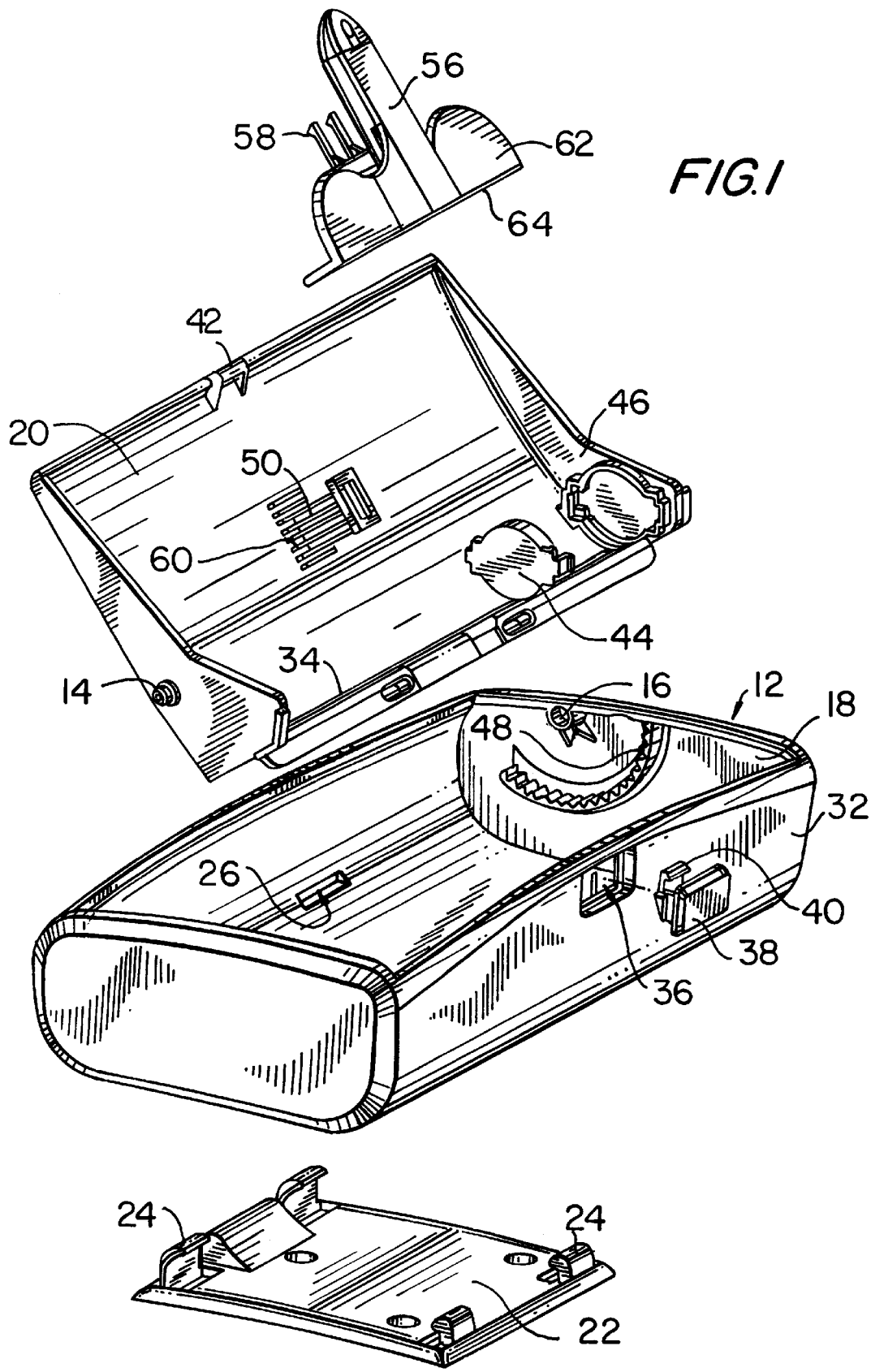
FIG. 1 is an exploded view of the individual parts of a container according to the invention.

The container for storing spectacles shown in the drawings and denoted as a whole by reference numeral 10 has a box-like housing 12 having an open upper side. A housing lid 20 is attached pivotably to the housing 12 by means of laterally projecting pivot pins 14 which rest in bearing holes 16 at upper edges of side walls 18 of the housing 12. To fasten the container 10, a fastening plate 22 is provided on its underside, which plate is provided for fastening for example by adhesion or by screwing onto a dashboard or the like of a motor vehicle. The fastening plate 22 has four upwardly projecting snap-in elements 24, which are provided to engage in recesses 26 in the housing 12 (see FIGS. 3 and 4). After attachment of the fastening plate 22 to the dashboard or the like, the housing 12 is pressed down onto the fastening plate 22 so that its snap-in elements 24 engage in the recesses 26 in the housing 12 and hold the housing 12 in place.

Figure 2:
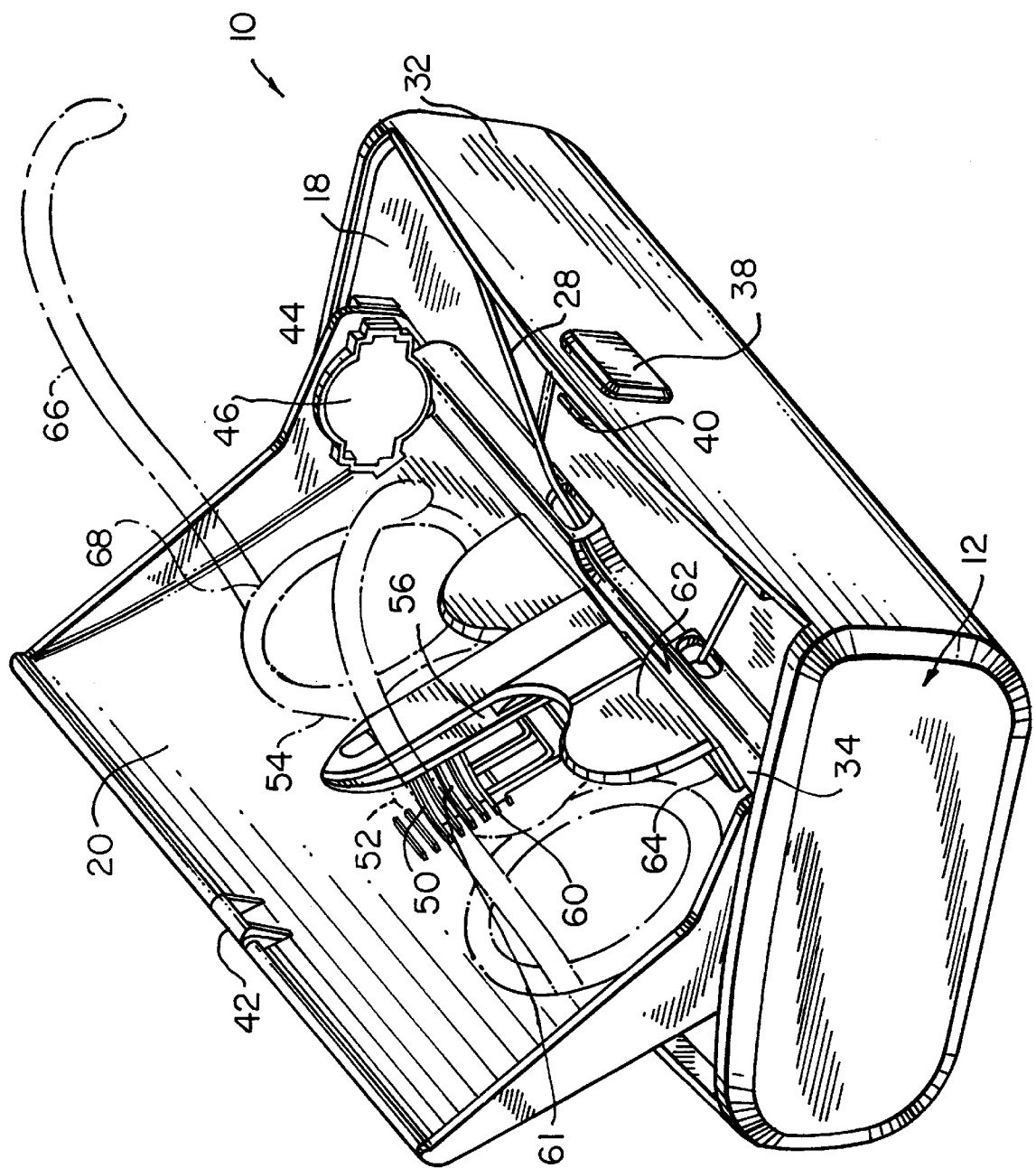
FIG. 2 is a perspective view of the opened container of FIG. 1.
Figure 3A:
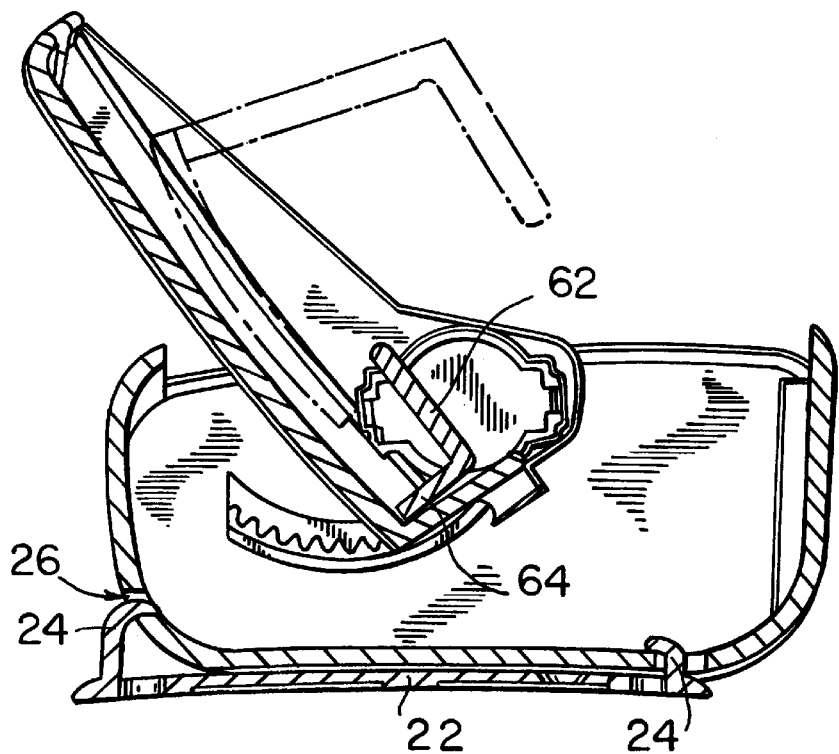
FIG. 3 is a section through the opened container of FIG. 1.
Figure 3B:
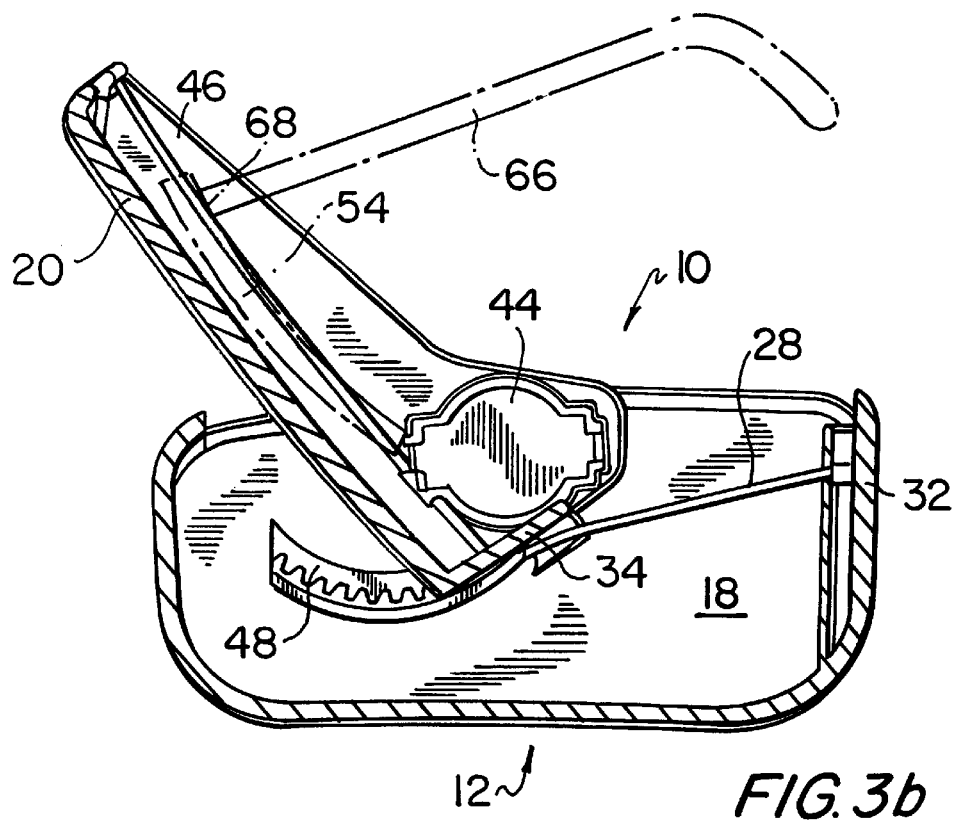

Mounted in the housing 12 parallel with the side walls 18 are two bands of rubber 28 which are spaced from the side walls 18 of the housing 12 by a distance that corresponds to about ¼ of the width of the housing 12 (the rubber bands 28 are not shown in FIG. 1). The rubber bands 28 are attached by clamping elements 30 to the inner side of a front wall 32 of the housing 12. They extend from the upper edge of the front wall 32 to the lower edge of a rear wall 34 of the housing lid 20, to which they are also fixed. In every position of the housing lid 20, the rubber bands 28 are below a pivotal axis defined by the pivot pins 14 and the bearing holes 16, which means that they draw the housing lid 20 into an open position, as shown in FIGS. 2 and 3.

Figure 4A:
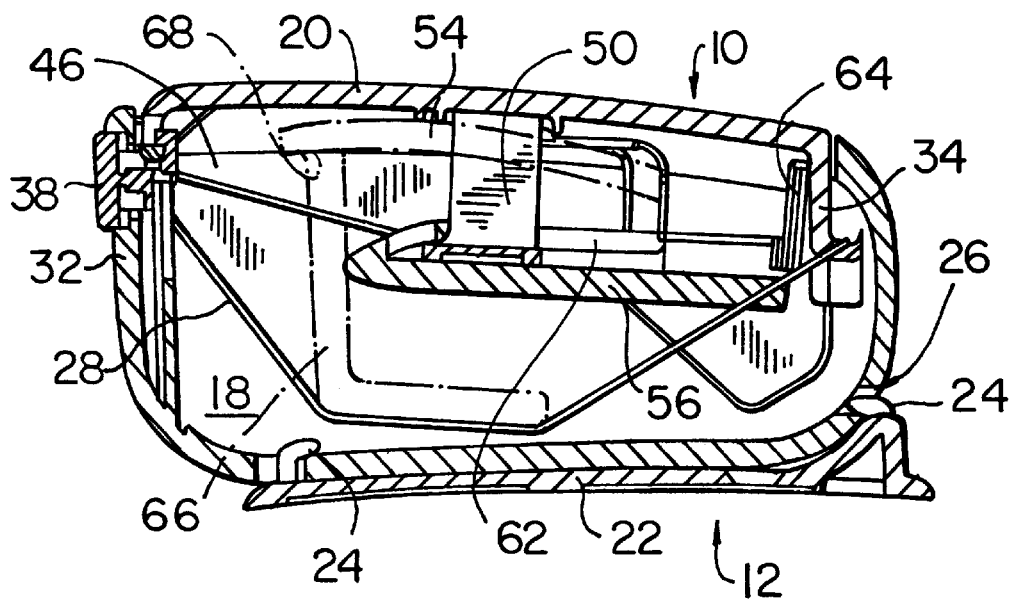
FIG. 4 is a section through the closed container of FIG. 1.
Figure 4B:
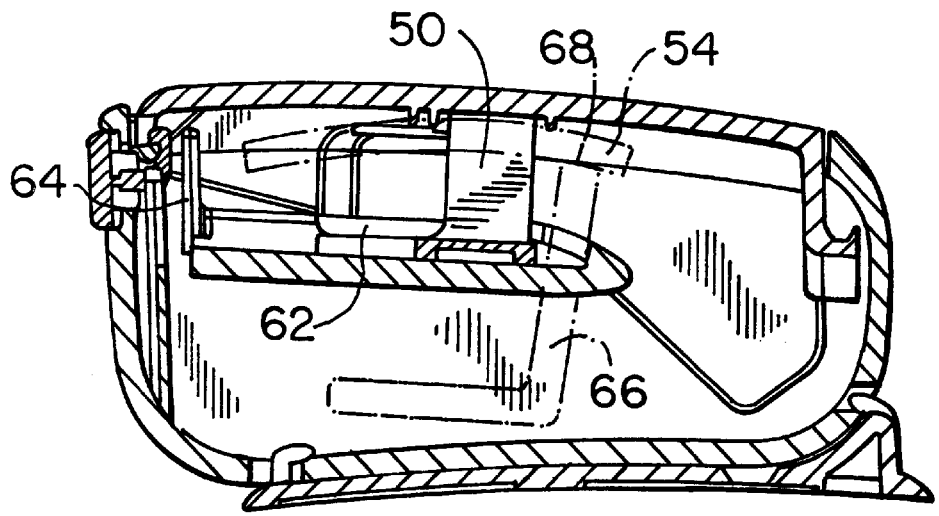

In order to hold the housing lid 20 in a closed position, as shown in FIG. 4, a locking element 38 is positioned in a recess 36 in the front wall 32 of the housing 12, which locking element can be pressed in resiliently and has a locking hook 40 which engages a locking hook 42 at the front edge of the housing lid 20 when the housing lid 20 is closed and thereby holds the housing lid 20 closed. To unlock, the locking element 38 is pressed in so that the two locking hooks 40, 42 disengage one another, whereupon the two rubber bands 28 lift up the housing lid 20 (the locking element 38 is not shown in FIGS. 3 and 4 in order to keep the drawing simple).

The pivoting movement of the housing lid 20 is damped by a rotary damping element 44 known per se positioned in a side wall 46 of the housing lid 20, the toothed wheel of which (not shown in the drawing) meshes with a toothed rack 48, which is integral with the side wall 18 of the housing 12 and is arranged in an arc around the bearing hole 16 for the pivot pin 14 of the housing lid 20.

The housing lid 20 forms a receiving compartment for the insertion of a pair of spectacles 54. It has a rest 50 for the nose bridge 52 of a pair of spectacles 54 (shown by dotted lines in FIGS. 2 to 4), which rest is integral with the housing lid and projects from the inside thereof. Mounted displaceably on the rest 50 and spaced from the housing lid 20 is a spectacle holder 56 which is adjustable in steps by means of a catch device 58, 60. At an end facing the rear wall 34 of the housing lid 20, the spectacle holder 56 has laterally projecting holding wings 62 and supports 64 projecting at right angles therefrom. The supports 64 are provided to support the frame of the spectacles 54 at their lower rim (see FIGS. 3 and 4). As a result of the displaceability of the spectacle holder 56, the distance of the supports 64 from the rest 50 for the nose bridge 52 of the spectacles 54 can be adjusted and can be adapted to different pairs of spectacles 54.

The container 10 for storing spectacles according to the invention functions as follows: when the container 10 is open, the spectacles 54 and their frame and lenses are inserted into the space between the spectacle holder 56 and the housing lid 20. The nose bridge 52 also passes into the space between the pin-shaped spectacle holder 56 and the housing lid 20 and lies on the rest 50 of the housing lid 20. Part of the spectacle lenses lies between the housing lid 20 and the holding wings 62 of the spectacle holder 56.

The spectacle holder 56 has sufficient space to the side of and above its holding wings 62 in the region of the spectacle hinges 68 to allow pivoting of the spectacle arms 66 of the spectacles 54 inserted between the spectacle holder 56 and the housing lid 20. As shown in FIG. 2, the spectacles 54 can be inserted into the housing lid 20 with the spectacle arms 66 open, that is to say projecting from the spectacle frame 54. The spectacle arms 66 are closed, that is to say pivoted to rest on the spectacle frame, only after the spectacles 54 have been inserted into the housing lid 20. They thereby engage over the pin-shaped spectacle holder 56 on its side remote from the housing lid 20 (FIG. 3). The spectacle holder 56 holds the spectacles 54 sufficiently for closure of the spectacle arms 66 without the spectacle frame having to be held by hand. The spectacle arms 66 can be closed with one hand without difficulty. The same applies also to removal of the spectacles 54: the spectacle arms 66 can be opened before the spectacles 54 are removed from the housing lid 20, the spectacle holder 56 holding the spectacle frame so that the spectacle arms 66 can be opened with one hand.

After the spectacles 54 have been inserted into the housing lid 20 and the spectacle arms 66 have been closed (that position is shown in FIG. 3), the housing lid 20 is closed against the tension of the rubber bands 28, thereby engaging in the locking element 38. The rubber bands 28 cross the spectacles 54 at their spectacle arms 66 and press them against the inside of the housing lid 20. In that manner, the spectacles 54 are held securely in the housing lid 20 when the container 10 is closed and do not make any rattling noises.

To remove the spectacles 54, the unlocking element 38 is pressed inwards, whereupon the housing lid 20 is pivoted open, damped by the damping element 44, and the spectacles 54 can be removed after the spectacle arms 66 have been opened.

What is claimed is:

1. Container for storing spectacles and for building into a vehicle, having a housing that is open at one side and a housing lid which is attached to the housing so as to be pivotable into an open position and into a closed position, characterised in that the housing lid (20) is in the form of a receiving compartment for the insertion of a pair of spectacles (54), and at least one elastic band (28) is mounted in the housing (12), towards which band the housing lid (20) pivots on closure so that the elastic band (28) presses an inserted pair of spectacles (54) against an inner side of the housing lid (20).

2. Container according to claim 1, characterised in that the elastic band (28) is a rubber band which, when the housing lid (20) is closed, extends in the housing (12) approximately parallel with the housing lid (20).

3. Container according to claim 2, characterised in that one end of the band (28) is attached to the housing (12) and another end of the band (28) is attached to the housing lid (20) and acts as a tension spring element that pivots the housing lid (20).

4. Container according to claim 1, characterised in that the housing lid (20) has a spectacle holder (56), which is mounted on the inside of the housing lid (20) spaced from the housing lid (20) so that the spectacles (54) can be inserted into the space between the spectacle holder (56) and the housing lid (20).

5. Container according to claim 4, characterised in that the spectacle holder (56) has free spaces in the region of spectacle hinges (68) so that the spectacles (54) can be inserted into the housing lid (20) that forms the receiving compartment with their spectacle arms (66) open.

6. Container according to claim 4, characterised in that the housing lid (20) has a rest (50) for the nose bridge (52) of the spectacles (54) and a support (64) for a spectacle frame at the circumference of the spectacle lenses, the distance between the support (64) and the rest (50) being adjustable.

7. Container according to claim 1, characterised in that the container (10) has a catch device (38, 40, 42) that can be unlocked, which holds the housing lid (20) in its closed position.

8. Container according to claim 1, characterised in that the container (10) has a damping element (44) which damps pivoting movement of the housing lid (20).

* * * * *